United States Patent
Alfonta et al.

(10) Patent No.: US 9,017,978 B2
(45) Date of Patent: Apr. 28, 2015

(54) SYSTEMS AND METHOD FOR BIO-ELECTRICITY PRODUCTION

(75) Inventors: Lital Alfonta, Omer (IL); Simon Fishilevich, Beer-Sheva (IL); Liron Amir, Michmoret (IL)

(73) Assignee: Bengurion University of the Negev Research and Development Authority, Beer-Sheva (IL)

( * ) Notice: Subject to any disclaimer, the term of this patent is extended or adjusted under 35 U.S.C. 154(b) by 610 days.

(21) Appl. No.: 13/138,351

(22) PCT Filed: Feb. 4, 2010

(86) PCT No.: PCT/IL2010/000099
§ 371 (c)(1),
(2), (4) Date: Oct. 24, 2011

(87) PCT Pub. No.: WO2010/089741
PCT Pub. Date: Aug. 12, 2010

(65) Prior Publication Data
US 2012/0028079 A1     Feb. 2, 2012

Related U.S. Application Data

(60) Provisional application No. 61/149,707, filed on Feb. 4, 2009.

(51) Int. Cl.
*C12N 11/00* (2006.01)
*C12N 11/16* (2006.01)
*C12P 1/00* (2006.01)
*H01M 8/16* (2006.01)
*H01M 4/86* (2006.01)

(52) U.S. Cl.
CPC . *H01M 8/16* (2013.01); *H01M 4/86* (2013.01); *Y02E 60/527* (2013.01)

(58) Field of Classification Search
None
See application file for complete search history.

(56) References Cited

U.S. PATENT DOCUMENTS

| 4,224,125 A | 9/1980 | Nakamura et al. |
| 5,208,154 A * | 5/1993 | Weaver et al. ............ 435/176 |
| 2004/0048112 A1 | 3/2004 | Halme et al. |
| 2007/0134520 A1 | 6/2007 | Shimomura et al. |
| 2008/0138663 A1 | 6/2008 | Kubo et al. |

FOREIGN PATENT DOCUMENTS

WO   WO 2005/038002   *   4/2005

OTHER PUBLICATIONS

Tippmann et al. "A genetically encoded metallocene containing amino acid" Tetrahedron 63(2007)6182-6184.*
Wu et al. "Synthesis at the Interface of Chemistry and Biology" J. Am. Chem. Soc. 2009, 131, 12497-12515.*
Xie et al. "A chemical toolkit for proteins—an expanded genetic code" Nature Reviews—Molecular Cell Biology vol. 7 | October 2006, 775-782.*
International Search Report for PCT/IL2010/000099, mailed May 19, 2010, 2 pgs.
Written Opinion for PCT/IL2010/000099, mailed May 19, 2010, 5 pgs.

* cited by examiner

*Primary Examiner* — Thane Underdahl
(74) *Attorney, Agent, or Firm* — Nixon & Vanderhye P.C.

(57) ABSTRACT

A system and method for bio-electricity production are provided. The system includes a microorganism fuel cell in which the anode compartment comprises a microorganism cell having displayed thereon an enzyme to oxidize the substrate and generate electrons. Microorganism cells, such as bacteria or yeast, may be transformed to display enzymes such as oxidases, alcohol dehydrogenases and glucoamylases.

13 Claims, 13 Drawing Sheets

SYSTEMS AND METHOD FOR BIO-ELECTRICITY PRODUCTION

FIELD OF THE INVENTION

This application is the U.S. national phase of International Application No. PCT/IL 2010/000099 filed 4 Feb. 2010 which designated the U.S. and claims priority to U.S. Provisional Application No. 61/149,707 filed 4 Feb. 2009, the entire contents of each of which are hereby incorporated by reference.

The present invention relates to the field of microbial fuel cells (MFCs). Some embodiments of the invention relate to use of surface displaying microbes in producing bio-electricity.

BACKGROUND OF THE INVENTION

Microbial fuel cells (MFCs) are devices capable of directly transforming chemical energy to electrical energy via electrochemical reactions involving biochemical pathways. A typical microbial fuel cell consists of anode and cathode compartments separated by a cation specific membrane. In the anode compartment, fuel is oxidized by microorganisms or by purified isolated enzymes, generating electrons and protons. Electrons are transferred to the cathode compartment through an external electric circuit, and the protons are transferred to the cathode compartment through the membrane.

Microbial based fuel cells exploit whole organism metabolism for catalyzing oxidation/reduction of metabolites (fuel) at the anode or cathode whereas enzyme based fuel cells utilize purified enzymes as catalysts.

Microbially catalyzed systems are generally robust, capable of completely oxidizing the fuel and have a long lifetime. However, these systems are limited by low current and power densities.

Enzymatically catalyzed systems are generally well defined systems showing higher current and power densities. However, enzyme based bio-fuel cells suffer from poor stability and short-term operational capacity, since enzyme stability and activity decline outside of the cellular milieu and since enzyme coupling with inorganic surfaces is poor. Further, enzymatic fuel cells still lack sufficient power density to render them applicable in "real world" applications, the main reason being their slow metabolic rates and lack of efficient means for transferring the electrons generated by substrate oxidation to the extracellular environment (namely, the anode).

Because living cells have metabolic pathways for oxidizing a wide variety of substrates, many biodegradable organic matter may be used in an MFC to generate power, including simple molecules such as carbohydrates and proteins and complex mixtures of organic matter including alcohols, fatty acids and carbohydrates present, for example, in waste waters. Thus, MFCs are ideal for renewable bioelectricity generation from biomass.

In the design of whole-cell-based microbial fuel cells, a significant step is the transfer of electrons back and forth between the microbe cell and the electrode. Optimized electron flow is currently hampered by the inefficient coupling between the electron acceptor (usually a gold electrode) and the electron donor (microorganism). Bare gold is a poor electron acceptor from electrogenic microorganisms. Also, the active site of most enzymes is embedded deeply within the protein matrix, thus negating the possibility of direct communication with electrodes. In most cases, in order to overcome these problems, an artificial mediator for electron transfer is used. These electron shuttles (such as thionine, methyl viologen, methyl blue, humic acid and neutral red) enable microorganisms to generate electrochemically active reduced products. Unfortunately, systems including mediators are not easily optimized and most of the available mediators are expensive and toxic.

Direct electron transfer was discovered in several microorganisms (termed exoelectrogens or electricigens). Thus it became possible to construct an MFC without requiring external mediators, by using exoelectrogens. However, the use of mediators is still appealing since it affords anodes with lower potentials, which increases the overall electromotive force (EMF) of a given MFC.

The limitations of the existing MFCs prevent this important technology from being used in "real world" applications.

There is a need for a self-sustaining and renewable system for efficient extraction of electrons from organic compounds.

SUMMARY OF THE INVENTION

Systems and methods according to some embodiments of the invention provide sustainable and efficient bio-electricity production.

Embodiments of the invention provide whole cell biocatalysts in which enzymes are displayed on the surface of the cells. Prokaryotic as well as eukaryotic cells or microorganisms may be used.

According to some embodiments contact between cells and surfaces is optimized by site-specific immobilization of cells displaying enzymes (such as red/ox enzymes or hydrolases) on their surfaces.

Systems according to some embodiments of the invention incorporate uniquely tailored electron relay units.

According to embodiments of the invention a system for bio-electricity production includes an anode compartment and a cathode compartment, said compartments being in fluid communication. The anode compartment comprises an anode electrode and a substrate; and the cathode compartment comprises a cathode electrode, said anode electrode and cathode electrode being in electrical communication. According to one embodiment the anode compartment comprises a microorganism cell having displayed thereon an enzyme which is capable of oxidizing the substrate. The microorganism cell may be prokaryotic or eukaryotic. A combination of different microorganisms may be used.

According to some embodiments the enzyme is an alcohol dehydrogenase or a glucoamylase. According to some embodiments a glucose oxidase is used by the system. A combination of enzymes may be used.

According to some embodiments the microorganism cell is immobilized onto the anode electrode by a red/ox active molecule. The red/ox active molecule may include an unnatural amino acid.

The system, according to embodiments of the invention, may include more than one type of microorganism cell, each cell type having displayed thereon a different enzyme.

According to some embodiments the cathode compartment may include a mediator and a microorganism cell having displayed thereon an enzyme to reduce oxygen to water.

According to some embodiments the environment in the anode compartment is anaerobic.

According to some embodiments at least the anode electrode is a modified gold electrode.

According to some embodiments the substrate may include sugars, alcohols, polysaccharides or a combination thereof.

According to an embodiment of the invention a method for bioelectricity production includes providing, within an MFC, an enzyme to oxidize a substrate, said enzyme being displayed on the surface of a microorganism cell. The method may include the step of transforming the microorganism cell with a plasmid comprising genes for surface display and a sequence coding for the enzyme. Another step of transforming the microorganism cell with an additional plasmid comprising components for an unnatural amino acid, may also be included in the method.

According to some embodiments the enzyme may be glucose oxidase, alcohol dehydrogenase and/or glucoamylase. Other enzymes may be used.

BRIEF DESCRIPTION OF THE FIGURES

The invention will now be described in relation to certain examples and preferred embodiments with reference to the following illustrative figures so that it may be more fully understood. In the drawings.

DETAILED DESCRIPTION OF THE INVENTION

Figure 1:
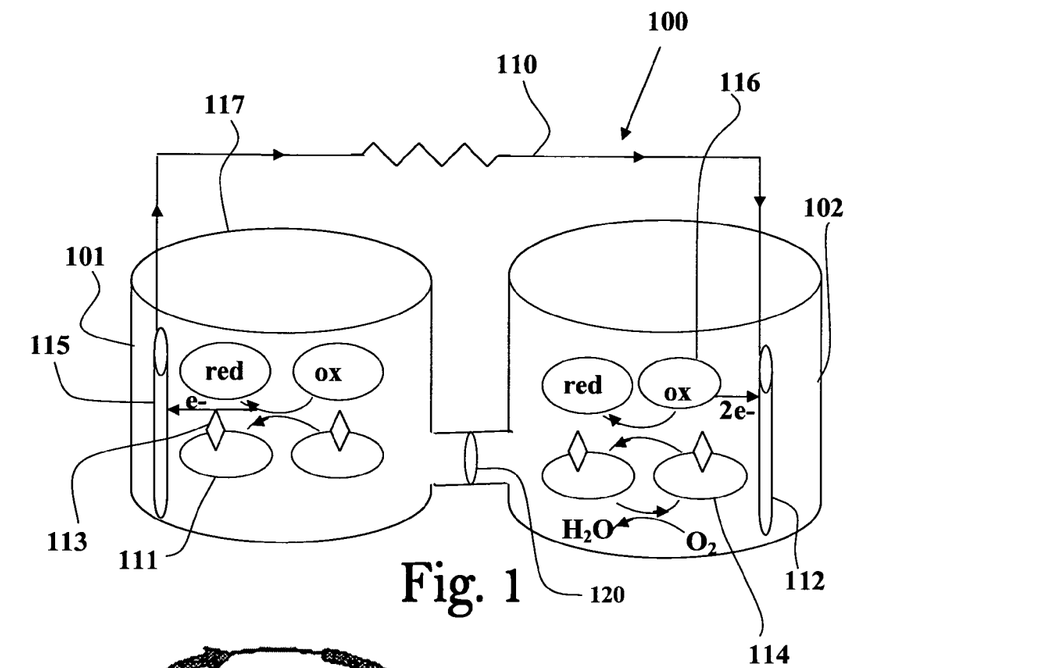
FIG. 1 schematically illustrates a system according to an embodiment of the invention.

A system according to embodiments of the invention is schematically illustrated in FIG. 1. System 100 includes an anode compartment 101 and a cathode compartment 102 which are connected by electrical conduit 110. The compartments are also in fluid communication with each other, where electrolytes may pass from one compartment to the other. According to some embodiments the compartments are separated by membrane 120.

In the anode compartment 101 a surface displaying cell 111 is immobilized to an electrode 115 for efficient electron transfer. The cell 111 displays on its surface a red-ox enzyme 113 which oxidizes a substrate (fuel) 117 thereby generating electrons and protons. The electrons are transferred through electrode 115 and conduit 110 to the cathode compartment 102 while the protons diffuse through the membrane 120. In the cathode compartment 102 a terminal electron acceptor, usually oxygen, is reduced by a suitable enzyme or microorganism or by an enzyme displaying microorganism 114. Electrons and protons are consumed on the electrode 112 surface. Optionally a mediator 116 may be used to facilitate electron transfer. With the arrival of electrons and protons from the anode compartment 101, oxygen is reduced to water.

The electric circuit of the system 100 is closed by the diffusion of electrolytes from compartment to compartment.

According to one embodiment the environment in the anode compartment 101 is anaerobic while in the cathode compartment 102, the electrode 112 is maintained under aerobic conditions. The two compartments are separated by a membrane 120, typically a proton exchanging membrane (PEM). This membrane allows protons, but ideally not substrate or oxygen to diffuse between the two compartments since oxygen in the anode compartment 101 may inhibit generation of electricity.

System 100 does not require the use of a mediator since the red/ox reaction is carried out through an enzyme that is essentially wired by red/ox active molecules to the electrode. According to some embodiments the cell displaying enzyme is wired in a site specific manner.

The use of both microorganism cell and enzyme provides an unpredicted synergistic effect enhancing current and power density of the system.

Surface display of heterologous proteins in microorganisms provides a known tool for various applications, however, protein surface display was never applied in the field of MFC. Surface display of proteins was successfully employed in E. coli cells. Also yeast surface display (YSD) is a known tool which allows eukaryotic expression of heterologous target proteins. The yeast endoplasmic reticulum acts as a quality control mechanism and ensures that only properly folded proteins reach the cell surface.

According to embodiments of the invention enzymes to be displayed on cell surfaces may have the following characteristics: monomeric, small, preferably no co-factor, no post-translational modifications, redox enzyme suitable for an anode (active in anaerobic environment), not endogenous to the host organism and have a substrate which is relevant to the field of MFC.

According to some embodiments of the invention NAD(P)$^+$-dependent and/or FAD dependent enzymes may be displayed on microorganism cell surface. Some examples of NAD(P)$^+$-dependent enzymes that may be used, include lactate dehydrogenase (LDH), EC 1.1.1.27; alcohol dehydrogenase (ADH), EC 1.1.1.71; glucose dehydrogenase (GDH), EC 1.1.1.118. Some examples of FAD dependent enzymes that may be used, include Glucose Oxidase (GOx), EC 1.1.3.4, Glucoamylases, Laccase, Horse radish peroxidase (HRP). Other enzymes may be used which facilitate the use of a variety of organic materials, such as lactate, alcohols, and glucose and even polysaccharides (such as starches or algae), as fuels.

More than one type of cell, each type displaying a different enzyme, may be used in a compartment of an MFC according to embodiments of the invention.

For example, the anodic compartment 101 may include yeast cells displaying GOx on their surface and yeast cells displaying glucoamylase. The fuel may be raw starch such that the starch is enzymatically broken down by the glucoamylase to sugars which can then be oxidized by the GOx.

The cathode compartment 102 may include laccase (from *Trametes Versicolor*) expressing *Saccharomyces Cerevisiae* (yeast). A mediator (e.g. 2,2'-azino-bis(3-ethylbenzo-thiazoline-6-sulfonic acid (ABTS)) may be used. According to one embodiment the cathode compartment 102 includes an oxygen saturated acetate buffer (pH 5).

The biocatalytic oxidation of fuel substrates requires efficient electrochemical regeneration of enzyme cofactors (e.g., $NAD(P)^+$ and FAD cofactors). The biocatalytically produced cofactors participating in the transport of electrons from the enzymes to the electrode, and the subsequent electrochemical oxidation of the reduced cofactors, regenerate the biocatalytic functions of the system.

Immobilization, typically by covalent attachment, of the cells to the electrode may be done by using red/ox active linkers, through which an electron may be easily transferred to the electrode. Suitable linkers may include unnatural amino acids. Unnatural amino acids enable orthogonal chemistry to be performed on the linked proteins, meaning that none of the natural amino acids will interact under these conditions, which enables a site specific attachment and orientation of the biomolecule on the surface (either displayed or not).

Some unnatural amino acids that may be used according to embodiments of the invention are listed in Wu, X., Schultz, P. G. Synthesis at the interface of chemistry and biology (2009) *J. Am. Chem. Soc.* 131, 12497-12515.

According to embodiments of the invention unnatural amino acids are incorporated into the target red/ox enzyme. According to one embodiment a microorganism cell (e.g., bacteria, yeast or other suitable cells) is transformed with a plasmid which includes the enzyme and then with an additional plasmid that includes the components for each specific unnatural amino acid to be incorporated into the target redox enzymes.

A cell displaying a selected red/ox enzyme with an unnatural amino acid incorporated may be attached to an electrode using methods such as photocrosslinking, electrochemical crosslinking and/or by using click chemistry.

Some examplary methods for wiring enzymes or cells displaying enzymes to an electrode are schematically illustrated in FIGS. 2A-D.

Figure 2A:
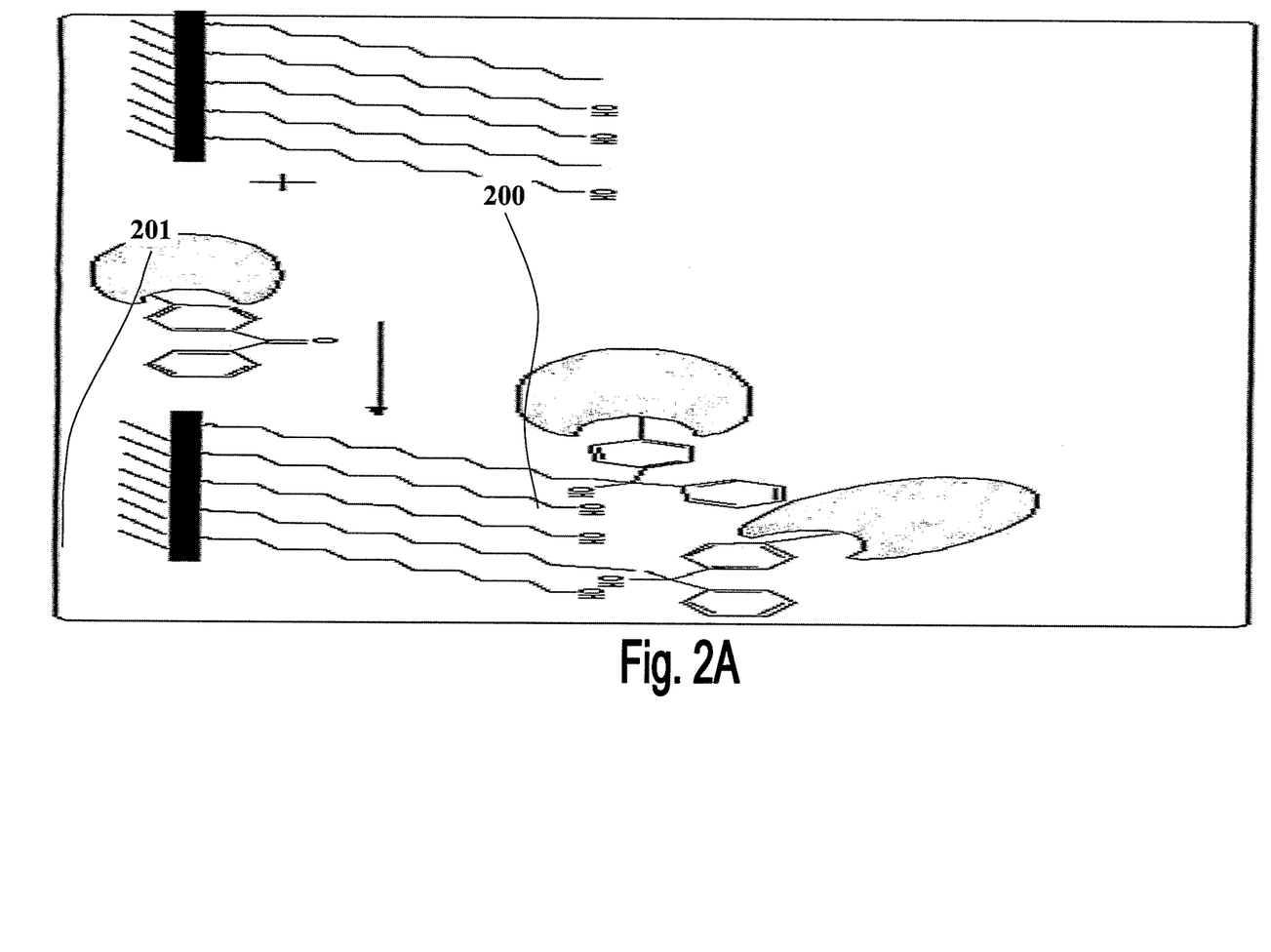
FIGS. 2A-D schematically illustrate examplary methods for wiring enzymes or cells displaying enzymes to an electrode, according to embodiments of the invention.

In FIG. 2A p-benzoyl-1-phe (pBP) is incorporated into various sites on the enzyme 200, and the cells (not shown) displaying the selected redox enzymes with the incorporated pBP are subjected to UV (e.g., 360 nm) irradiation for photocrosslinking to a gold electrode 201 modified with alkyl thiol groups.

Figure 2B:
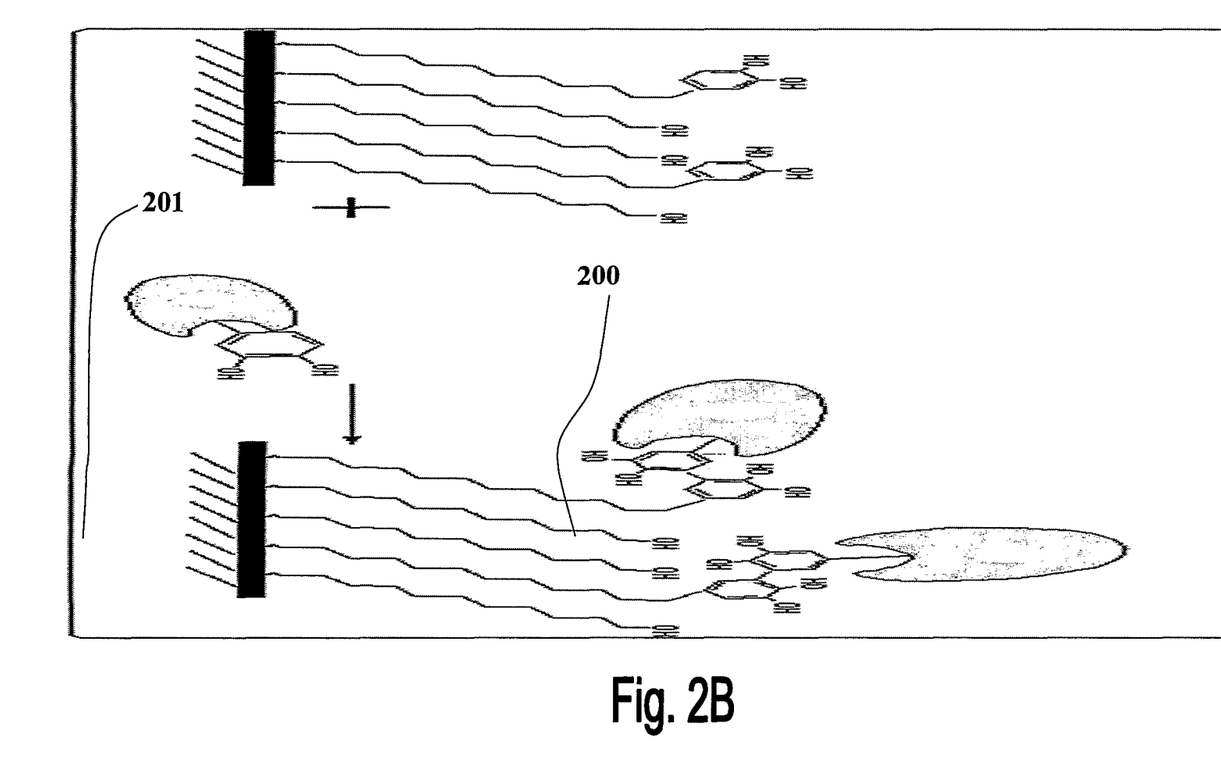

In FIG. 2B enzymes 200 incorporating di-hydroxy-1-phe (L-DHP) are subjected to electrochemical crosslinking to a gold electrode 201 modified with a mixed monolayer of alkane thiolate ethylane glycol and 3,4-hydroquinone-alkane thiolate.

Figure 2C:
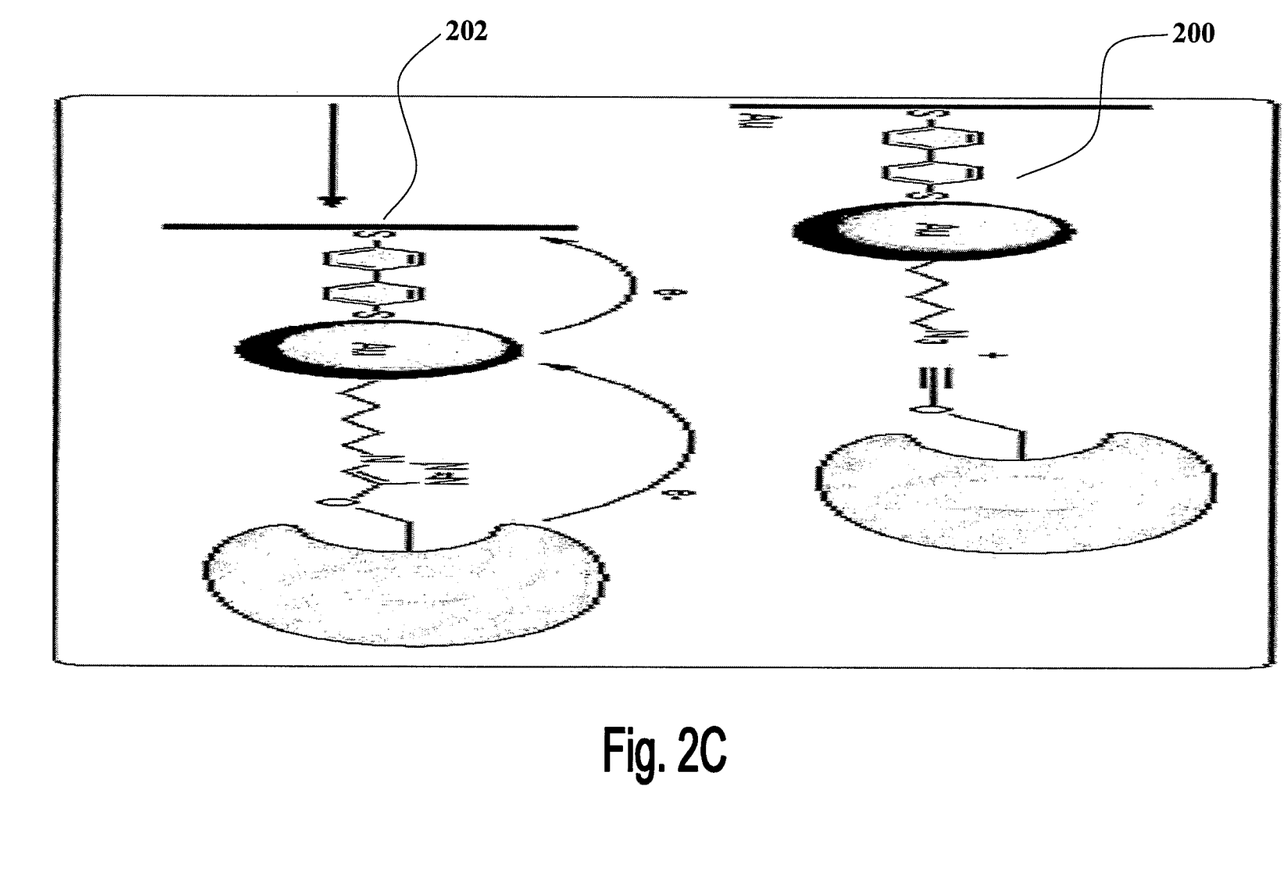
Figure 2D:
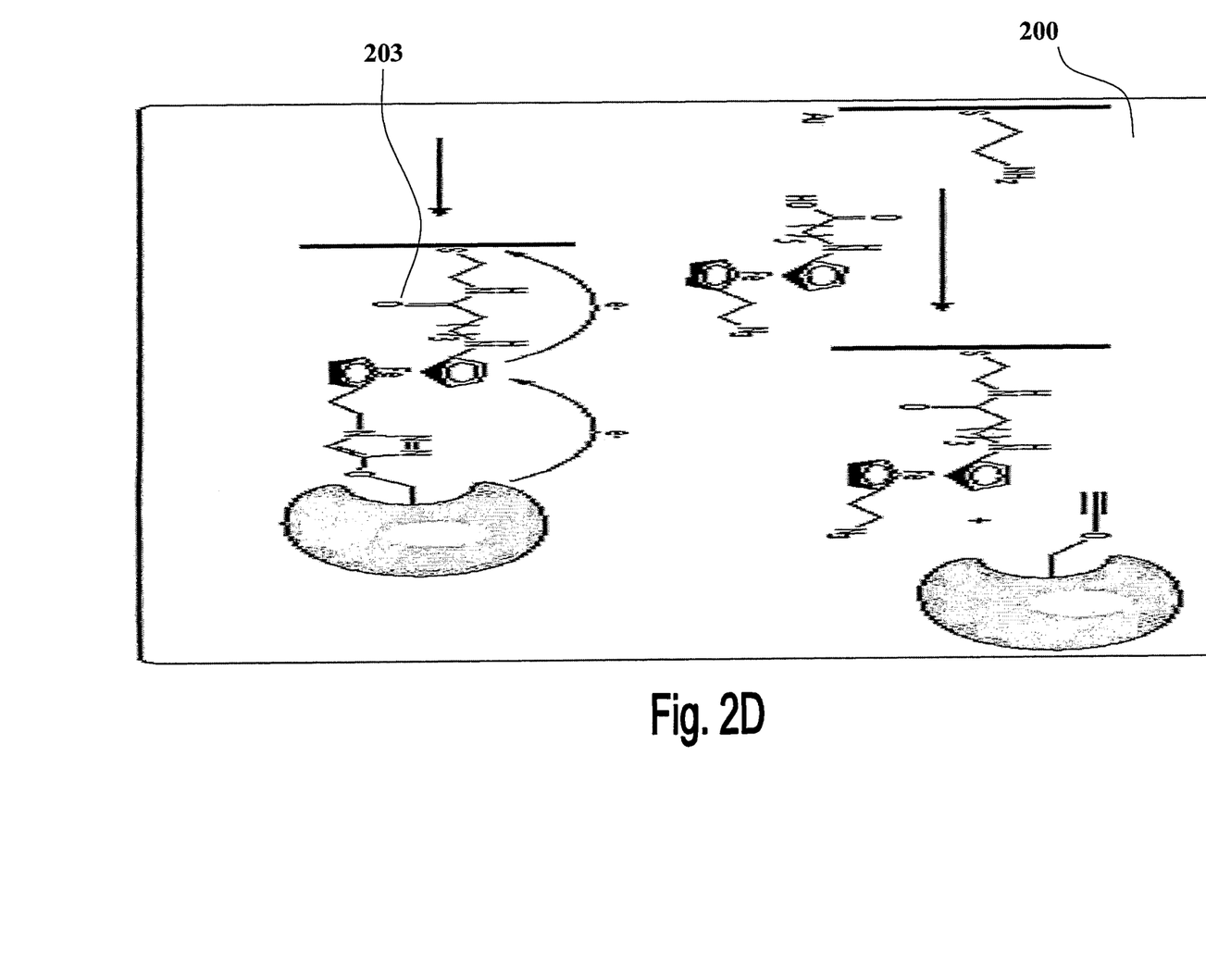

In alternative embodiments, p-azido-1-phe (pAzP) and p-propargyloxy-phe (pPROP) are incorporated into surface-exposed sites on a surface-displayed enzym 200 to enable orthogonal links (that may function as an electron relay unit) of the displayed enzymes to gold nanoparticles 202 or to carboxylic acid ferrocene derivatives 203 as depicted in FIGS. 2C and 2D, respectively.

Click chemistry may be used (incorporation of an azide or amine into the red/ox enzyme 200 is interchangeable)

Some examples will now be described to further illustrate the invention and to demonstrate how embodiments of the invention may be carried-out in practice. In the Examples an anodic process is shown, but the same flow sheet can equally be applied to different sets of enzymes for the process at the cathode compartment. Although the Examples relate to specific microorganisms and specific enzymes and linkers, these are intended only to exemplify the invention and not to limit the scope of the invention.

EXAMPLES

Genes encoding for red/ox enzymes 1. GOx, 2. ADH II and 3. GA (glucoamylase which is not a red/ox enzyme but a hydrolase) were cloned into plasmids containing genes for surface display of proteins on the surface of microorganisms (*E. coli*, yeast).

The efficiency and activity of the displayed red/ox enzymes was determined electrochemically and biochemically.

Enzyme displaying cells were immobilized onto electrodes and a fuel cell using the engineered immobilized cells was constructed and tested.

1) Construction of Plasmids for Cell Surface Display of GOx

GOx is a Flavo enzyme, homo-dimer, which catalyzes the oxidation of D-glucose to gluconic acid.

Figure 3:
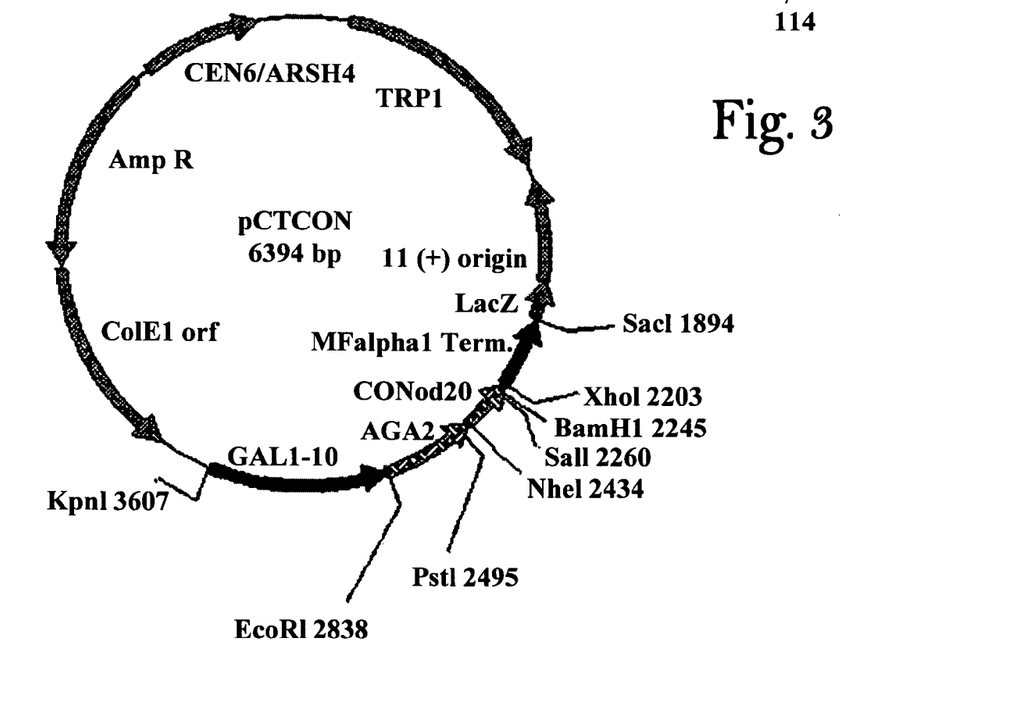
FIG. 3 is a schematic presentation of a pCTCON GOx plasmid according to embodiments of the invention.

*Aspergillus niger* GOx gene (1818 bp) was cloned into pCTCON (see FIG. 3), with (nucleotides 1 . . . 1815) and without (nucleotides 64 . . . 1815) its own signal sequence, yielding plasmids pC-GOx(+) and pC-GOx(−), respectively. Constructed ligation products were sequenced and transformed into *Saccharomyces cerevisiae* strain EBY100.

Genomic DNA from *Aspergillus niger* was isolated using the MasterPure™ Yeast DNA Purification Kit (Epicentre). GOx gene was amplified by PCR. The PCR product and yeast surface display vector pCTCON were digested with NheI and BamHI, and the GOx gene was ligated into the BamHI-NheI backbone of pCTCON, yielding plasmids pC-GOx(+) (including GOx own signal peptide) and pC-GOx(−) (excluding GOx own signal peptide). All cloning steps were done by standard methods.

Yeast Transformation

Yeast transformation was performed using the lithium acetate method. A freshly streaked EBY100 colony was inoculated in 5 ml YPD media and grown overnight at 30° C. The overnight culture was inoculated in 100 ml YPD media to an absorbance of 0.1 at 600 nm. The cells were grown at 30° C. to an absorbance of 1.2 at 600 nm. Cells were harvested by centrifugation at 4000 rpm for 5 min at 4° C., and re-suspended in 50 ml $H_2O$. After another centrifugation cells were re-suspended in 1 ml $H_2O$, harvested again (2 min, max speed), and re-suspended in 300 µl $H_2O$. Each transformation reaction contained 100 µl treated yeast cells, 480 µl PEG 50%, 72 µl LiAc 1 M, 10 µl herring sperm 10 mg/ml, 30 µl $H_2O$, 30 µl plasmid (200-300 ng). After a short vortex, the reaction was incubated for 30 min at 30° C. 30 µl DMSO was added and the reaction was incubated for 15 min at 42° C. and continuous shaking. After a 30 sec spin at max speed, the pellet was re-suspended in 200 µl $H_2O$ and the cells were plated on selective SC-TRP plates, then grown at 30° C. for 48 hr.

Display of GOx on the Yeast Surface
A) Fluorescence Activated Cell Sorting (FACS)

Transformed yeast were grown overnight in 5 ml SDCAA at 30° C. The culture was refreshed (100 μl starter culture to 5 ml SDCAA) and grown (4-6 hr) to an absorbance of 1-1.2 at 600 nm. 1 ml of the culture was harvested by centrifugation (60 sec max speed) and re-suspended in 5 ml of inducing media. Induced culture was grown with shaking (250 rpm) for at least 18 hrs, at different temperatures: 20° C., 30° C., 37° C.

$10^7$ (equivalent to 1 ml of 1 OD600 nm) of induced yeast cells were collected by centrifugation (60 sec max speed). The pellet was washed with 0.5 ml PBSF buffer (rinsed, and pelleted again). Yeast cells were labeled with mouse anti-c-Myc IgG1 (1:100 dilution, Lot. #H1307, Santa Cruz) in 50 μl of PBSF buffer. Re-suspended cells were incubated for 1 hr at 25° C. and 400 rpm. Yeast cells were collected by centrifugation (60 sec max speed) and washed twice with ice cold PBSF buffer. After addition of secondary reagents (goat anti-mouse FITC conjugate (1:50 dilution, Sigma F4143)), cells were incubated on ice and shielded from light for 1 hr. After two washes with ice cold PBSF buffer, the cells were re-suspended in ice cold 0.5 ml PBSF buffer. 70 μl cells suspension was diluted in 0.5 ml PBS and the mixture was analyzed by flow cytometry.

Control cultures: Positive controls were yeast expressing PCNA on their surface (induced at 20° C.). Negative controls were wild type EBY100 yeast (grown in YPD, at 30° C.).

Figure 4:
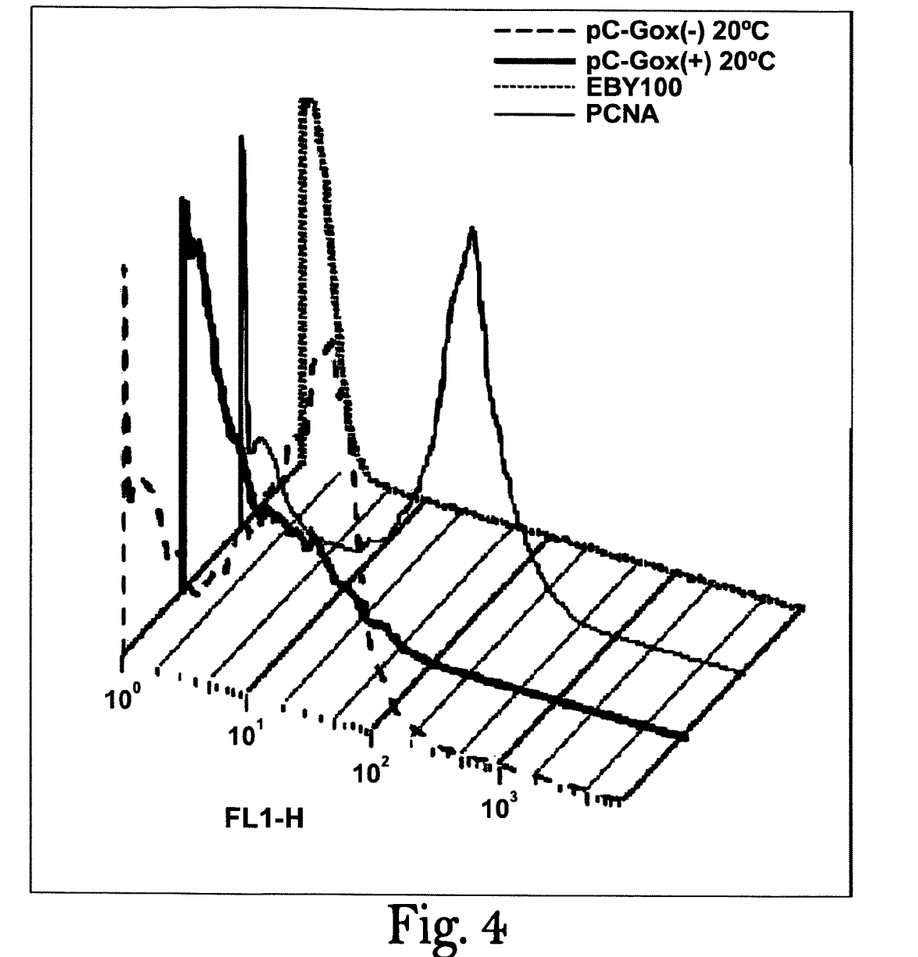
FIG. 4 presents flow cytometry results of GOx expression levels, according to an embodiment of the invention.

GOx expression levels were determined by indirect immunofluorescence of a C-terminal c-myc epitope tag using flow cytometry, the results of which are displayed in FIG. 4, which is a histogram analysis of wild type EBY100 cells without added plasmid, cells displaying PCNA, cells displaying GOx without its own signal peptide (containing plasmid pC-GOx(−)), and cells displaying GOx with its own signal peptide (containing plasmid pC-GOx(+)), according to the legend in the figure.

Flow cytometric histograms always showed background auto fluorescence with intensity below 10 by cells not expressing GOx, which is a typical phenomenon of yeast display system and likely to be caused by plasmid loss during culturing. Significant positive labeling of the c-myc epitope tag demonstrated the expression of GOx on the yeast cell surface. Labeling levels were higher for pC-GOx(−) compared to pC-GOx(+) transformants at all expression temperatures. pC-GOx(−) was expressed at all induction temperatures tested (20° C., 30° C., and 37° C.).

B) Western Blot Analysis

Figure 5:
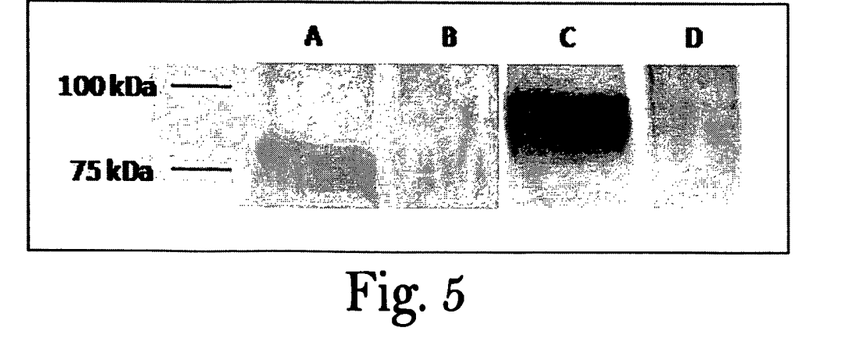
FIG. 5 shows the result of a Western blot showing expression of GOx, according to an embodiment of the invention.

A Western blot was run using anti-GOx antibody, showing high expression of GOx. An image of the Western blot is shown in FIG. 5, in which:
(A) Whole cell lysate of yeast containing pGREG504-GOx (not active)
(B) Whole cell lysate of yeast containing pC-GOx(−) (without induction);
(C) Whole cell lysate of yeast containing pC-GOx(−) (after induction);
(D) Media of DTT treated yeast containing pC-GOx(−) (after induction).

Native GOx dimer has MW of 150 kDa-186 kDa.

Cell Surface Displayed GOx Activity
A) Color Reaction Analysis

Figure 6:
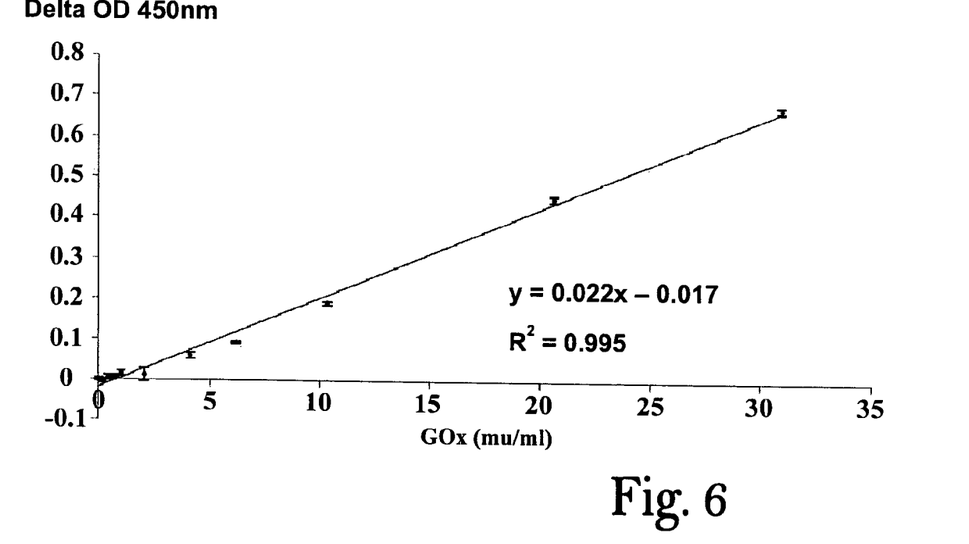
FIG. 6 shows a calibration curve of GOx activity, according to an embodiment of the invention.

Glucose oxidase activity was determined by the detection of horseradish peroxidase activity. As GOx metabolizes glucose into gluconic acid, $H_2O_2$ is formed as a byproduct. $H_2O_2$ can be used by horseradish peroxidase to oxidize o-phenylenediamine dihydrochloride, resulting in a color change. Samples were prepared in 100 μl of reaction mixture (100 mM glucose, 0.2 U/ml horseradish peroxidase). To each sample o-phenylenediamine dihydrochloride (SIGMA FAST™ OPD) solution (100 μl of 0.4 mg/ml) was added. The mixture was incubated at room temperature for 30 min, in dark. Absorbance was measured at 450 nm against a standard curve (FIG. 6) with different concentrations of GOx incubated in the same way. From each measurement a blank value was subtracted (same mixture, without glucose) to achieve delta $OD_{450}$ values. All measurements were conducted at triplicates and experiments were carried out at least 3 times with similar results.

B) Biochemical Characterization

Whole cell GOx activity was tested by the detection of horseradish peroxidase (HRP) activity. As GOx metabolizes glucose into gluconic acid, $H_2O_2$ is formed as a byproduct. $H_2O_2$ can be used by HRP to oxidize o-phenylenediamine dihydrochloride (OPD), resulting in a color change. Cells were washed and suspended in 100 mM potassium phosphate buffer (pH 7.4), and added to reaction mixture (100 mM glucose, 0.2 U/ml HRP). To each sample (100 μl final volume) SIGMA FAST™ OPD solution (100 μl of 0.4 mg/ml) was added. The mixture was incubated at room temperature for 30 min, in darkness. Absorbance was measured at 450 nm against a standard curve with different concentrations of commercial GOx incubated in the same way. A background value was subtracted from each measurement to achieve $\Delta OD_{450}$ values.

Figure 7:
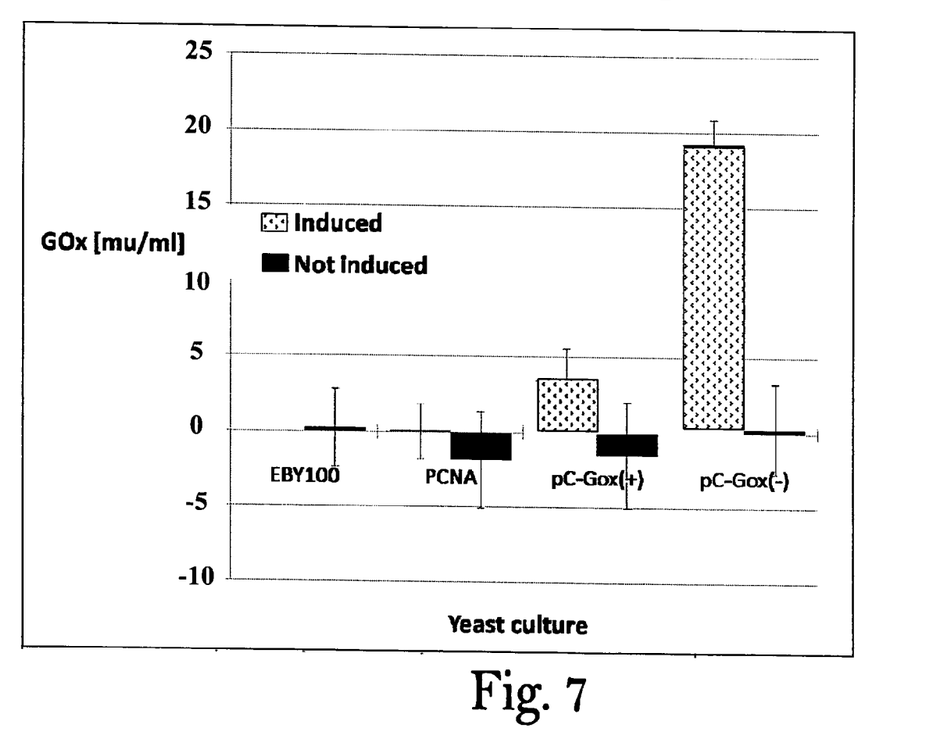
FIG. 7 shows activity tests for the yeast displaying GOx relative to yeast not expressing the enzyme, according to an embodiment of the invention.

The results of the activity test carried out were calculated to be ~41000 enzyme/cell or ~1.888 nU GOx/cell, are shown in FIG. 7. All cultures were tested at $OD_{600}=1$, in 100 μL volume (equivalent to $10^6$ cells).

Yeast containing plasmid pC-GOx(−) that were induced for expression of yeast surface display product showed significant GOx activity, while all negative controls showed negligible GOx activity. Induced yeast containing plasmid pC-GOx(+) showed GOx activity, however lower than pC-GOx(−) yeast. Negative controls that were checked included wild type EBY100, induced and not induced yeast expressing on their surface Proliferating Cell Nuclear Antigen (PCNA), and not induced yeast containing plasmids for YSD expression of GOx.

C) Cyclic Voltammetry

Cyclic voltammetry measurements were performed to test the electrochemical properties of the engineered cells. The measurements were carried out with VSP potentiostat (Bio-Logic Science Instruments). The cyclic voltammetry was performed in a three electrode standard cell, using graphite sticks (0.9 mm diameter) as working and counter electrodes, and an Ag|AgCl|KCl 3M as the reference electrode. Measurements were conducted in 100 mM PB solutions, with 5 μM methylene blue as electron transfer mediator, in 5 ml final volume. Measurement scan rate was 5 mV/sec, at potential range of −0.35 V to 0.15 V. All measurements were carried out at ambient temperature and in anaerobic conditions.

Figure 8:
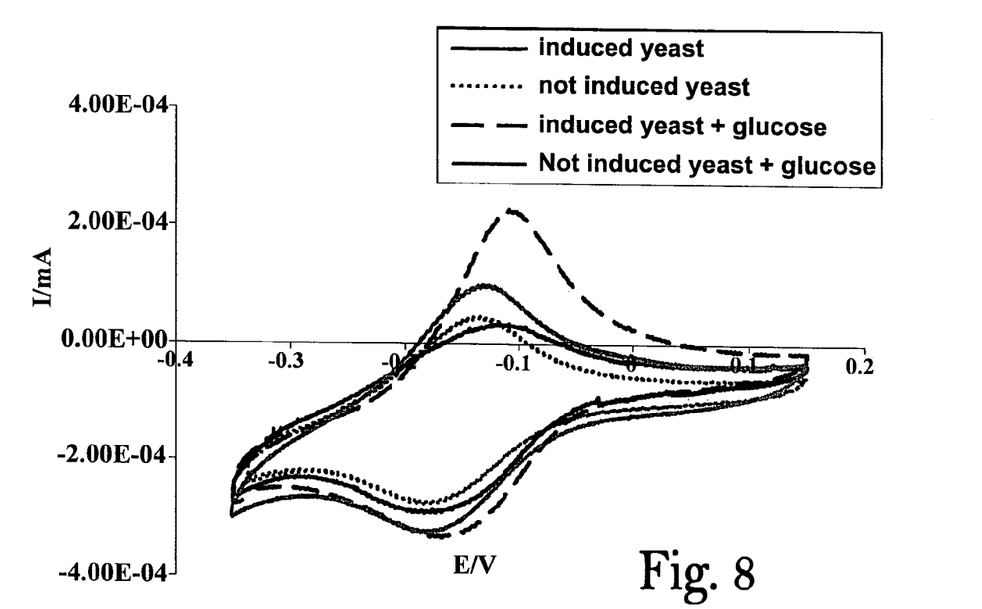
FIG. 8 shows cyclic voltammograms of yeast displaying GOx.

The results are displayed in FIG. 8. These results, which are cyclic voltammograms of yeast in 100 mM PB and 5 μM methylene blue, show a significant increase of the oxidation current produced after addition of glucose to GOx expressing yeast, relative to yeast not expressing GOx.

Tested cultures: Yeast expressing GOx, with and without presence of 100 mM glucose, yeast not expressing GOx, with and without presence of 100 mM glucose.

2) Construction of Plasmids for Cell Surface Display of ADH II

ADH II is an alcohol dehydrogenase that facilitates the interconversion between alcohols and aldehydes or ketones with the reduction of NAD+ to NADH.

Figure 9:
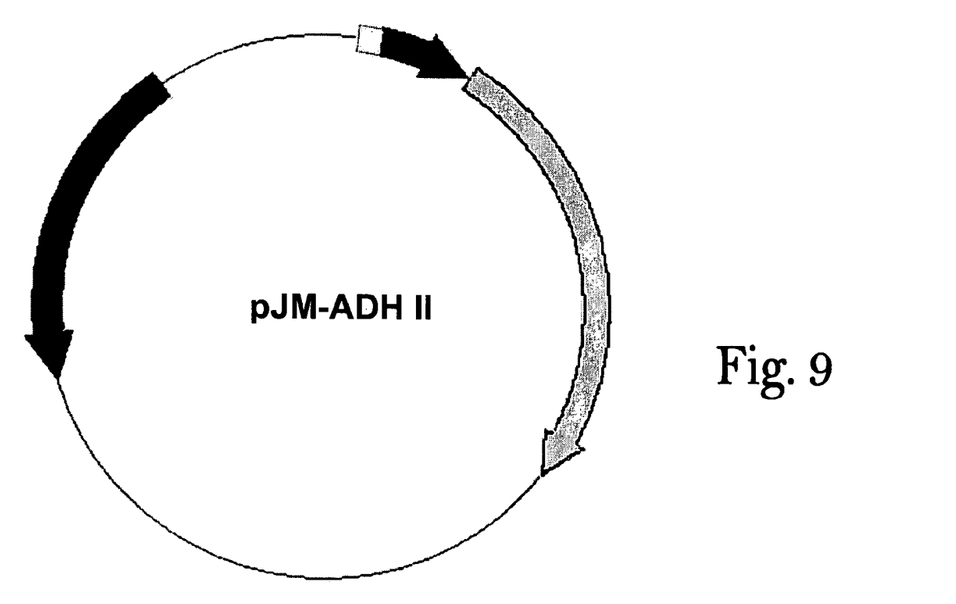
FIG. 9 is a schematic illustration of a pJM7-ADH II plasmid, according to an embodiment of the invention.

*Zymomonas mobilis* ADH II gene (1146 bp) was amplified from the bacterial genome and cloned into autodisplay plasmid pJM7 4652 bp plasmid (see FIG. 9), Constructed ligation products were sequenced and transformed into bacteria *E coli* strain jk321.

Bacteria Transformation

Bacteria transformation was performed by electroporation. Reaction mixture consisted of 40 µl Dh5α electro-competent cells (pre-treated cells that went through several washing steps in order to remove salts) and 1-3 µl of DNA sample. Reaction mixture was incubated on ice for 1 min and transformed into 0.2 cm electroporation cuvettes (USA Scientific). Bacteria were electroporated by MicroPilser™ (BIORAD) and immediately incubated in SOC media for 1 hr at continuous shaking. After recovery cells were plated on LB-agar plates containing selection marker (100 µg/ml Carbenicillin) and grown over night at 37° C. SOC is a nutrient rich media which contains 2% tryptone, 0.5% yeast extract, 8.56 mM NaCl, 2.5M KCl, 10 mM $MgCl_2$ and 20 mM glucose.

Cell Surface Displayed ADH II Activity

Figure 10:
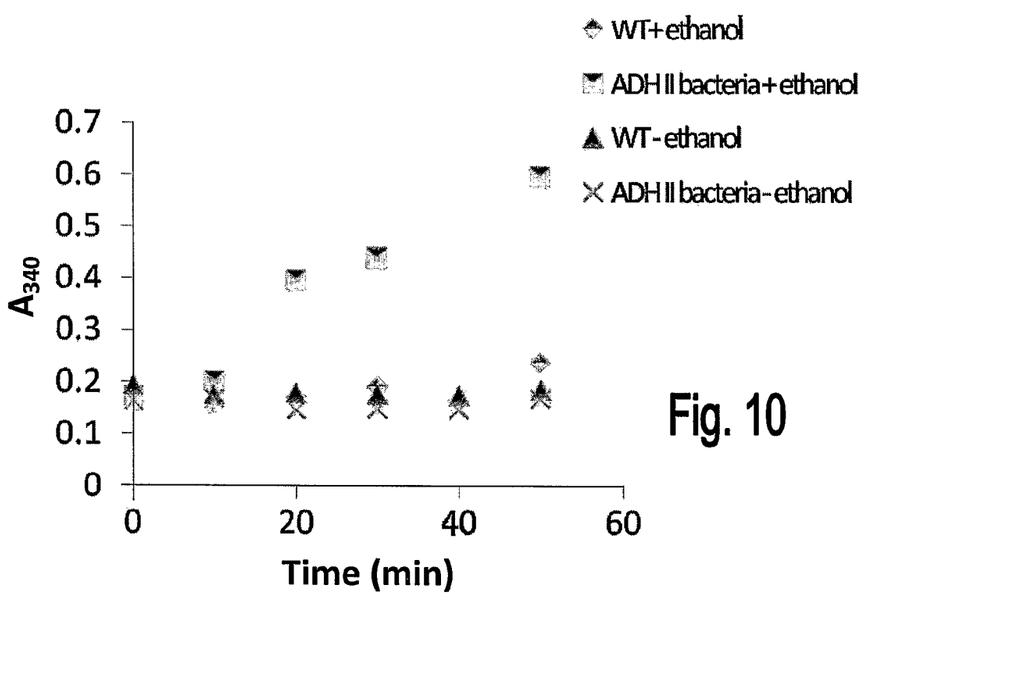
FIG. 10 shows activity of bacteria auto displaying ADHII, according to an embodiment of the invention.

Alcohol dehydrogenase catalyses the reduction of $NAD^+$ to NADH in the presence of primary alcohols. ADH activity was determined by tracking NADH formation, measuring the absorbance at 340 nm. Bacteria samples (155 µl, $OD_{600}$=1) were incubated with 5 µl $NAD^+$ solution (20 mg/ml), and 40 µl of ethanol was added. The Absorbance was measured at 340 nm for an hour. From each measurement a blank value was subtracted to achieve delta $OD_{340}$ values. As shown in FIG. 10, ADH II displaying bacteria showed high activity in the presence of alcohol.

3) Construction of Plasmids for Cell Surface Display of Glucoamylase

Glucoamylase catalyses the hydrolysis of α-1,4 bonds of amylase chains in starch, breaking off glucose units from the end of the chain.

Figure 11A:
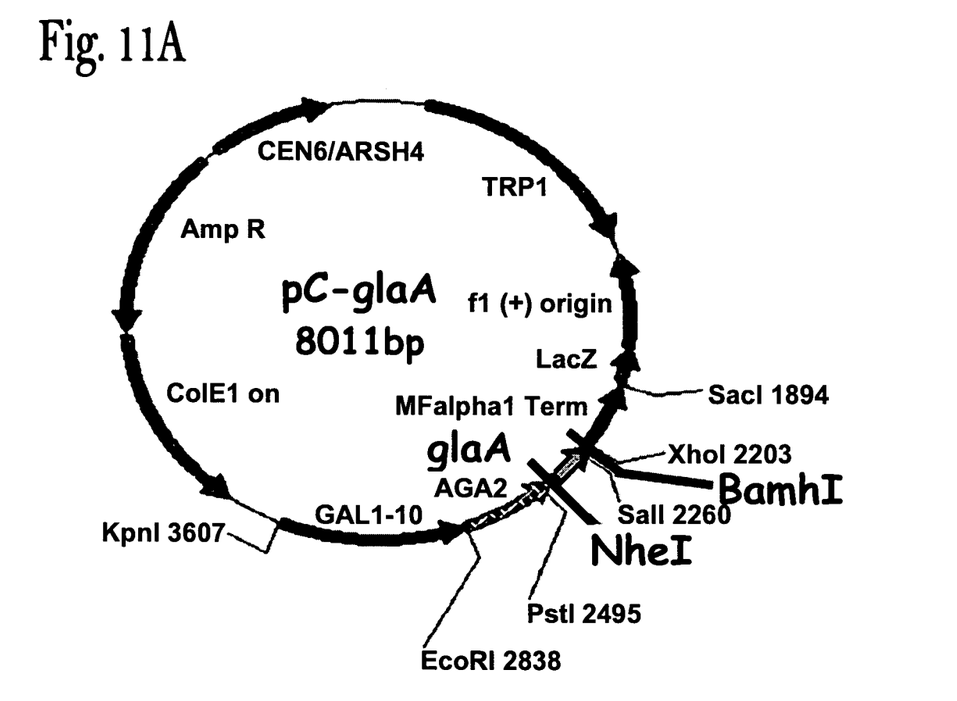
FIG. 11 is a schematic illustration of a pC-glaA plasmid according to an embodiment of the invention.
Figure 11B:
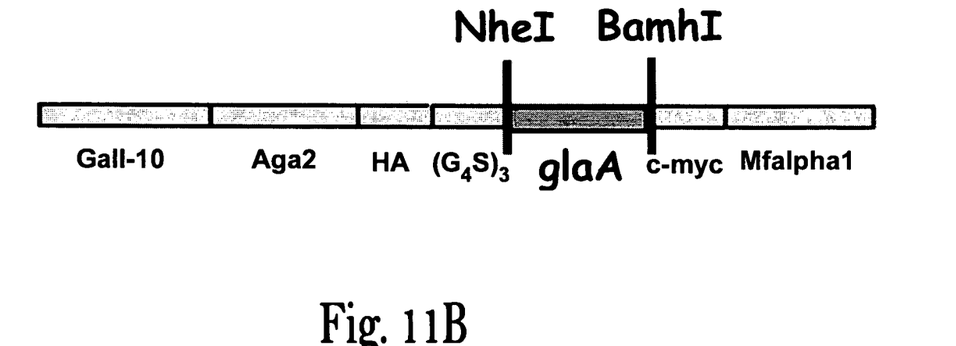

The pC-glaA plasmid was constructed (FIG. 11).

In this plasmid the a-agglutinin surface display consists of two epitope tags that were introduced into the YSD system vectors, allowing quantification of display by immuno-fluorescence labeling. The first is a 9 amino acid peptide epitope from the hemagglutinin antigen (HA), which is fused to the C-terminus of Aga2p, and followed by the desired protein. The second is c-myc, a 10 amino acid epitope which is fused to the C-terminus of the displayed protein.

Either, HA or c-Myc epitope tag can be used for surface expression measurements through immunofluorescence labeling by fluorescence activated cell sorting (FACS).

The gene for glucoamylase (glaA) can encode for two different glucoamylase enzymes G1 and G2 which vary in the COOH-terminal region. The glaA gene (8011 bp) was synthesized by GeneScript USA inc., following modifications to encode for G1 enzyme. All introns were removed from the sequence of glaA together with the enzyme secretion signal sequence (1-54 bp) and TAG stop codon. Two restriction sites were added; NheI 5' GCTAGC and BamHI 3' GGATCC. In order to prevent restriction in undesignated sites, two mutations were enforced.

Constructed ligation products were sequenced and transformed into yeast.

Yeast Transformation

Yeast transformation was performed using the lithium acetate method, as described above for GOx transformation.

Display of GA on the Yeast Surface

Figure 12:
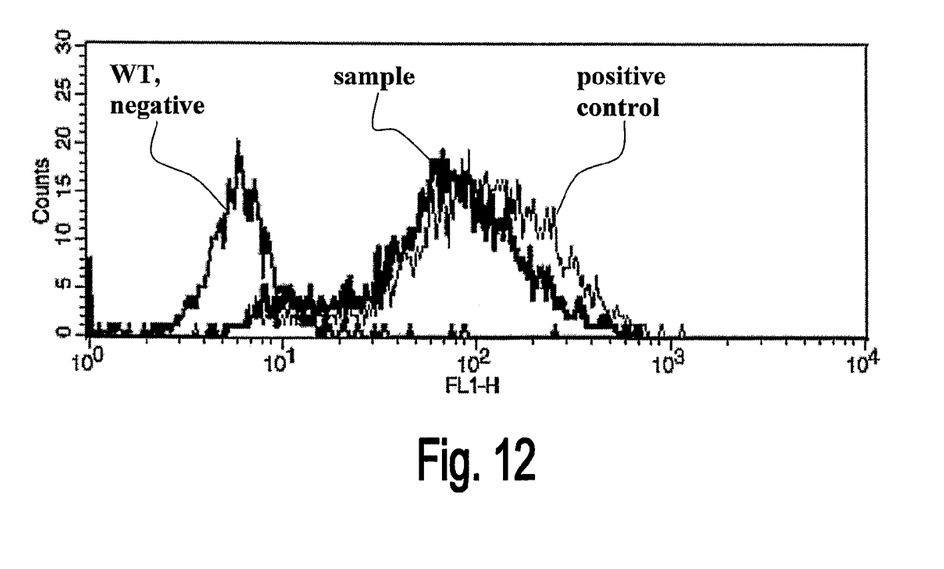
FIG. 12 shows a histogram of a FACS procedure testing for the display of glucoamylase in yeast, according to an embodiment of the invention.

FIG. 12 shows a histogram of a FACS procedure testing for the display of glucomylase in yeast. Signal intensity is shown per the number of cells where FL1-H stands for a filter that receives light at 548 nm. The negative control, wild type EBY100 showed a high population of cells with very low signal. The positive control, yeast expressing PCNA, showed a high population of cells with a high fluorescent signal. The sample—yeast expressing GAs on their surface—shows a curve similar to the positive control, a high population of cells with high labeling indicating that the structure is indeed expressed on the surface of yeast. Further, the results show that in this sample, 88% of the cells in the yeast culture express the enzyme.

Cell Surface Displayed GA Activity

Transformed yeast were grown overnight in induction medium consisting of 4.5 ml SGCAA, 0.5 ml SDCAA, 5 µl Ferric citrate 0.2 mM, and 50 µl 5-amino-levulinic acid 3.6 mM at 30° C. to an absorbance of 1-1.2 at 600 nm. 1 ml of the culture was harvested by centrifugation (60 sec max speed) and re-suspended in 1 ml of phosphate buffer with 1% raw starch. Yeast culture was incubated at 30° C. with shaking (250 rpm). The culture was centrifuged (60 sec max speed) and the supernatant was checked using a colorimetric assay.

Glucoamylase activity was determined by the detection of horseradish peroxidase (HRP) activity. Glucoamylase digests starch into glucose. In the presence of $O_2$ and glucose oxidase (GOx) the formed glucose is metabolized into gluconic acid accompanied by production of $H_2O_2$. $H_2O_2$ can be used then by horseradish peroxidase to oxidize o-phenylenediamine dihydrochloride (OPD), resulting in a color change. Absorbance of the samples was measured at 450 nm against a standard curve with different concentrations of commercial glucose.

Figure 13:
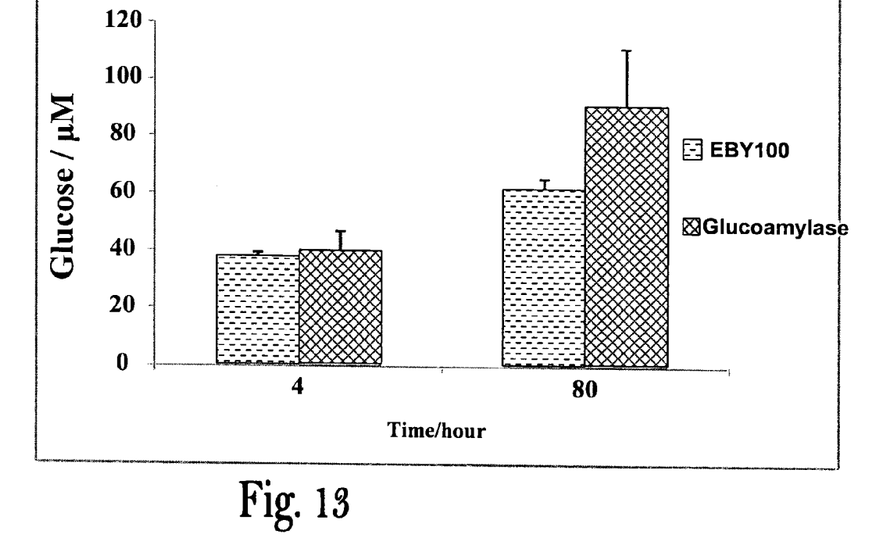
FIG. 13 shows activity of glucoamylase displayed on yeast compared with non modified yeast, according to an embodiment of the invention.

As can be seen in FIG. 13, after 4 hours there were no significant differences between the WT yeasts and the cloned culture. However, after 80 hours there was a statistically significant difference between the yeast cultures.

The same significant result was achieved in the WT culture as well. Baker's yeast contains glucoamylase but it is reported as inefficient against raw starch.

It is important to add that the colorimetric assay detects product consumption in the culture. Since yeasts digest glucose, what is shown here is the NET production of glucose from digesting starch by glucoamylase. In order to check the total production of glucose, an assay that detects the starch disappearance needs to be carried out.

Immobilization of Cells Displaying Enzymes to Electrodes

The incorporation of unnatural amino acids into a cell displayed enzyme is done by co-transformation of a plasmid encoding for the mutant synthetase and tRNA and the plasmid containing the enzyme to be displayed on the cell surface.

Figure 14:
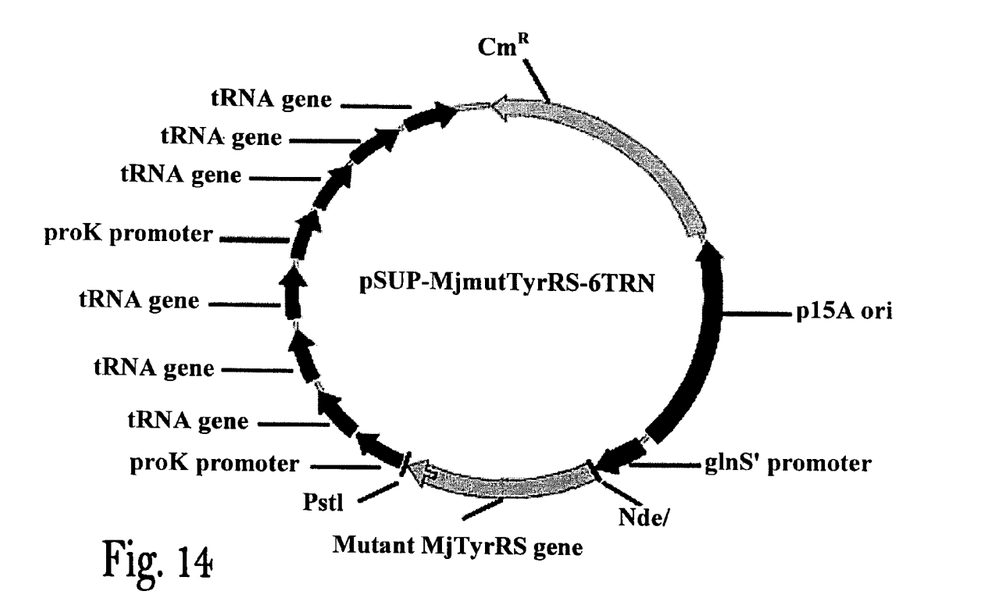
FIG. 14 schematically illustrates a plasmid for the incorporation of unnatural amino acids, according to one embodiment of the invention.

A plasmid for the incorporation of unnatural amino acids is illustrated in FIG. 14. Several "nano-wires" may be used to attach the cell displaying the enzyme and unnatural amino acids, for example, as discussed with reference to FIGS. 2A-D.

Microbial Fuel Cell Testing

Performance of a fuel cell built according to an embodiment of the invention was tested.

Figure 15A:
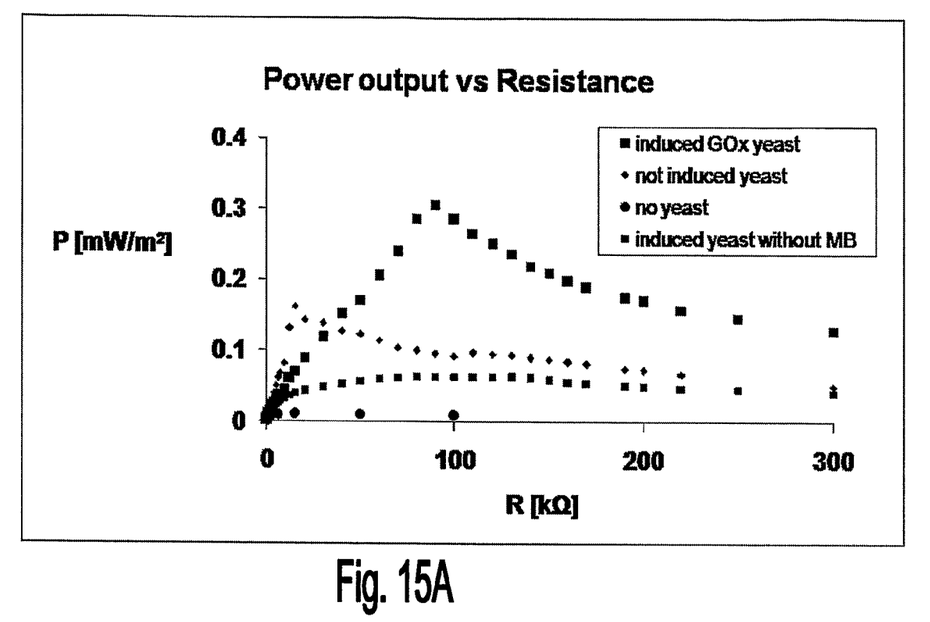
FIG. 15A shows a V-I plot (voltage versus current density) of the MFC, according to one embodiment of the invention.

An MFC similar to the system described with reference to FIG. 1, was constructed. Its performance was tested by applying variable load resistances and by measuring the generated voltages. FIG. 15A presents a V-I plot (voltage versus current density) of the MFC.

Figure 15B:
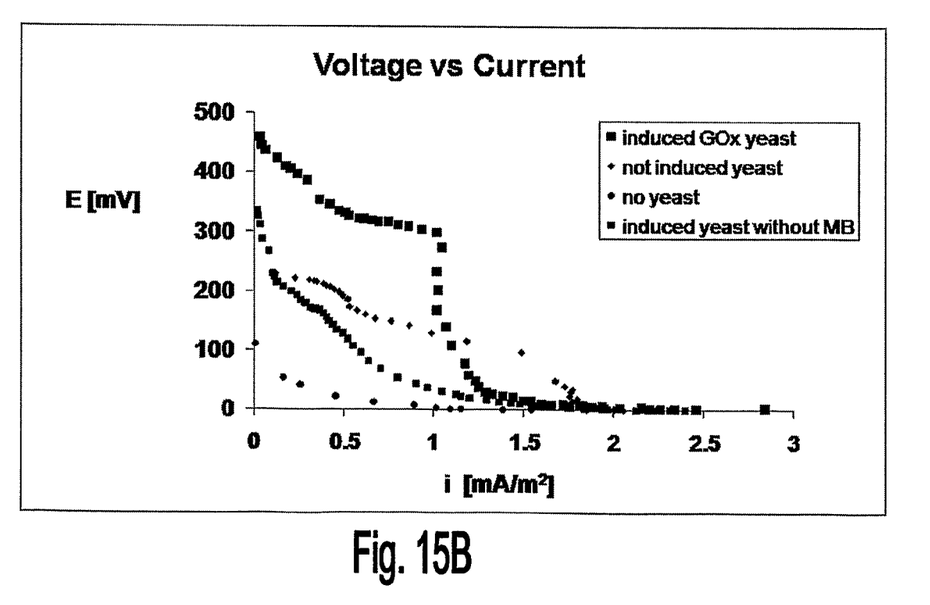
FIG. 15B shows the power density produced by the MFC upon connecting to the variable resistances of FIG. 15A.

The power density, produced by the MFC upon connecting to the variable resistances was derived from the V-I measurements (FIG. 15B).

In one example, the open circuit voltage ($V_{oc}$) value of GOx expressing yeast biofuel cell was 460 mV, short circuit current density ($i_{sc}$) was approximately 1.2 $mA/m^2$. The maximum released power density, $P_{max}=0.31$ mW/m$^2$, was observed at the external load resistance of 90 kΩ.

Figure 16:
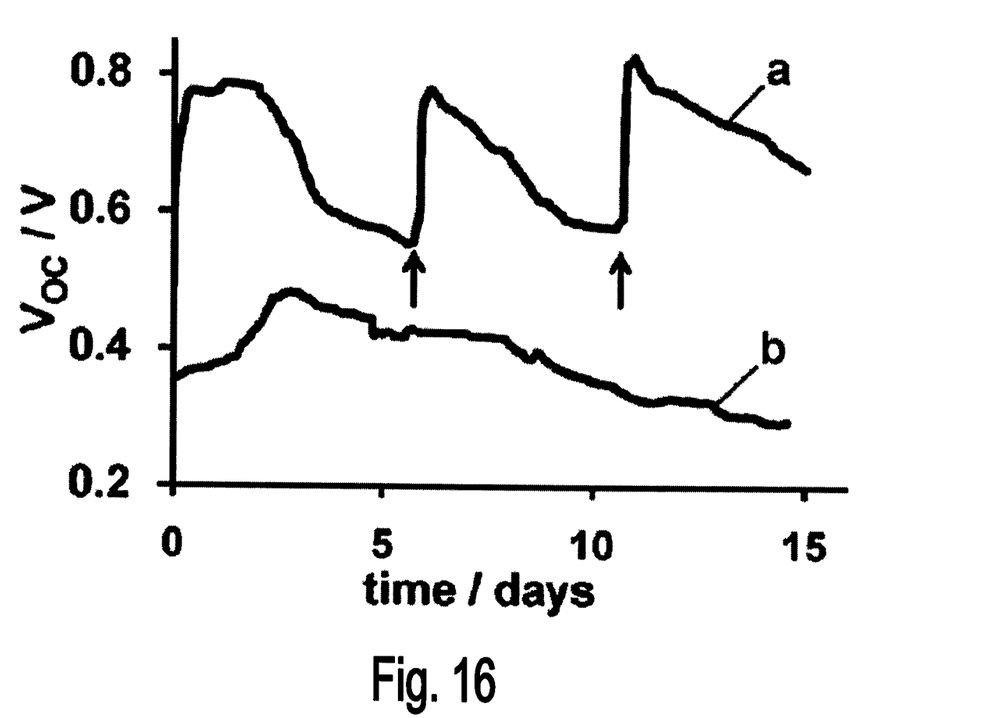
FIG. 16 shows regenerability of the display system according to an embodiment of the invention.

Long term performance was tested over 15 days, as shown in FIG. 16. Activity regained upon induction of expression (curve a) is shown as opposed to the purified enzyme that looses activity in time (curve b).

In long term experiments OCV values of two fuel cells were tested simultaneously, one containing GOx expressing yeast, the other containing the same amount of purified enzyme. Both cells were applied for about 15 days. Twice, after 5 and 10 days (marked by arrows in FIG. 16), yeast culture was re-induced for the expression of GOx in order to show the regeneration ability of the system.

Regenerated yeast were prepared as follows: a yeast sample (0.5 ml) was taken out from the anode compartment of a working fuel cell, and incubated over-night in SDCAA media (5 ml). After another cycle of dilution and overnight incubation the yeast sample was incubated in induction media, and returned to the fuel cell.

The invention claimed is:

1. A system for bio-electricity production, the system comprising:
    an anode compartment and a cathode compartment, said compartments in fluid communication,
    wherein the anode compartment comprises an anode electrode and a substrate;
    wherein the cathode compartment comprises a cathode electrode, said anode electrode and cathode electrode being in electrical communication,
    said system characterized in that the anode compartment comprises a microorganism cell having displayed on its surface an enzyme whose amino acid sequence includes an unnatural amino acid that is incorporated into a red/ox active molecule, the enzyme being configured to oxidize the substrate; and
    wherein the microorganism cell is immobilized onto the anode electrode by the red/ox active molecule.

2. The system according to claim 1 wherein the enzyme is an alcohol dehydrogenase or a glucoamylase.

3. The system according to claim 1 wherein the enzyme is a glucose oxidase.

4. The system according to claim 1 further comprising at least one additional microorganism cell, each additional cell having displayed the on its surface a different enzyme, whose amino acid sequence includes an unnatural amino acid that is incorporated into a red/ox active molecule, the different enzyme being configured to oxidize a different substrate; and
    wherein each additional cell is immobilized onto the anode electrode by the red/ox active molecule.

5. The system according to claim 1 wherein the cathode compartment comprises a mediator and a microorganism cell having displayed thereon an enzyme, said enzyme to reduce oxygen to water.

6. The system according to claim 1 wherein the anode compartment comprises an anaerobic environment.

7. The system according to claim 1 wherein at least the anode electrode is a modified gold electrode.

8. The system according to claim 1 wherein the substrate is selected from the group consisting of: sugars, alcohols, polysaccharides or a combination thereof.

9. The system according to claim 1 wherein the microorganism cells are selected from the group consisting of prokaryotic cells and eukaryotic cells.

10. A method for bioelectricity production, the method comprising: providing, within a microbial fuel cell, an enzyme to oxidize a substrate, said enzyme being displayed on the surface of a microorganism cell, wherein said enzyme is a red/ox enzyme whose amino acid sequence includes an unnatural amino acid that incorporates a red/ox active molecule, said enzyme being configured to oxidize the substrate; and
    wherein the microorganism cell is immobilized onto the anode electrode by the red/ox active molecule.

11. The method according to claim 10 comprising transforming the microorganism cell with a plasmid comprising genes for surface display and a sequence coding for the enzyme.

12. The method according to claim 11 further comprising transforming the microorganism cell with an additional plasmid encoding for a mutant synthetase and tRNA which incorporate the unnatural amino acid into the amino acid sequence of the enzyme.

13. The method according to claim 10 wherein the enzyme is selected from a group consisting of: glucose oxidase, alcohol dehydrogenase and/or glucoamylase.

* * * * *